Patented July 20, 1948

2,445,538

UNITED STATES PATENT OFFICE 2,445,538

MANUFACTURE OF QUINIZARINE

Frederic L. Sievenpiper, Alden, N. Y., assignor to Allied Chemical & Dye Corporation, New York, N. Y., a corporation of New York No Drawing. Application April 13, 1946, Serial No. 662,083

6 Claims. (Cl. 260—383)

This invention relates to the manufacture of quinizarine (1,4-dihydroxyanthraquinone). It relates more particularly to improvements in the process of manufacturing quinizarine by condensation of phthalic anhydride (phthalic acid anhydride) with p-chlorophenol, or another non-sulfonated derivative of phenol adapted to condense with phthalic anhydride to form quinizarine, in a sulfuric acid reaction medium containing boric acid.

Quinizarine is an important intermediate for the manufacture of a number of dyestuffs and related products. One method commonly employed for its manufacture comprises heating a mixture of p-chlorophenol, phthalic anhydride and boric acid in sulfuric acid, to effect condensation of the phthalic anhydride with the p-chlorophenol (or sulfonate thereof formed as an intermediate product); and then heating further, usually at a higher temperature, to effect ring closure of the condensation product and replacement of the chlorine by a hydroxyl group. The sulfuric acid serves as reaction medium, as sulfonating agent for the chlorophenol—it generally being considered desirable to form the sulfonate thereof as a preliminary step of the process—as condensing agent, and as hydrolyzing agent for effecting replacement of the chlorine by a hydroxyl group. The boric acid appears to protect the quinizarine from further attack by the sulfuric acid, by forming a boric ester of quinizarine. Instead of p-chlorophenol, other non-sulfonated derivatives of phenol which are adapted to condense with phthalic anhydride to form quinizarine have been similarly treated; as, for example, hydroquinone, o-chlorophenol, and mixtures of o- and p-chlorophenols. (See U. S. Patent 2,003,859; Reynolds and Bigelow, "Journal of the American Chemical Society," vol. 48, 1926, pages 420–22; British Patent 245,584; and Fierz-David and Blangey, "Farbenchemie," 1944 ed., pages 226–27.)

As pointed out by Reynolds and Bigelow, the purity of the quinizarine obtained varies with the reaction conditions. For use in making dyestuffs and related products, the quinizarine preferably should contain only a small amount (not more than a few percent by weight) of impurities which are insoluble in organic solvents of the type of chlorobenzene and toluene.

As usually practiced, amounts of sulfuric acid fifteen to twenty times the weight of the p-chlorophenol are employed in order to secure commercially satisfactory yields and quality of quinizarine. For example, a commercially satisfactory yield of quinizarine of satisfactory purity has been obtained by mixing 33 parts of boric acid, 920 parts of 96% sulfuric acid, 130 parts of phthalic anhydride and 50 parts of p-chlorophenol (all parts being by weight); gradually heating the stirred mixture over the course of about 4 hours to 190° C.; heating the stirred mixture at 190° to 200° C. for 6 hours to complete the reaction; pouring the resulting reaction mixture into 10,000 parts of hot water (80° to 90° C.); boiling the aqueous mass for about an hour to hydrolyze the boric ester of quinizarine; filtering; washing the filter-cake acid-free with water; and drying the washed filter-cake at 100° C.

The use of large amounts of sulfuric acid as a reaction medium constitutes an item of expense of the process, not only because of the sulfuric acid itself, but also because of the size of the equipment required for handling the large bulk of the reaction mixture. It has been attempted to reduce considerably the quantity of sulfuric acid employed in processes of the above type, but the yield and quality of the quinizarine obtained was adversely affected.

An object of the present invention is to provide improvements in the process of manufacturing quinizarine by condensation of phthalic anhydride with p-chlorophenol (or another non-sulfonated derivative of phenol adapted to condense with phthalic anhydride to form quinizarine) in a boric-sulfuric acid reaction medium, whereby the amount of sulfuric acid employed can be substantially reduced without adversely affecting the yield and quality of quinizarine.

Other objects of the invention in part will be obvious and in part will appear hereinafter.

According to the present invention, the manufacture of quinizarine by condensation of phthalic anhydride, in a boric-sulfuric acid reaction medium, with a non-sulfonated derivative of phenol adapted to condense therewith to form quinizarine, is carried out by adding the derivative of phenol, in portions of the total amount to be employed, over a considerable period of time (at least two hours, and preferably at least three hours) to a mixture of the other reactants (phthalic anhydride, boric acid or anhydride, and sulfuric acid) while maintaining the reaction mixture at a quinizarine-forming temperature. I have discovered that, when the reaction is carried out in this manner, the amount of sulfuric acid employed can be greatly reduced without adversely affecting the yield and quality of the quinizarine obtained and without requiring a substantial increase in the reaction time, and that a preliminary sulfonation of the derivative of the phenol can be omitted. As compared with processes wherein the reactants are heated together from room temperatures to a quinizarine-forming temperature (e. g. about 200° C.) or wherein p-chlorophenol is added within a few minutes to the remaining reactants while heating at such a temperature, improvements in yield and especially in quality of quinizarine are obtained by the gradual addition of p-chlorophenol to the reaction mass in accordance with the present invention. These improvements appear to result from the fact that, in the process of the present invention, a relatively small proportion of p-chlorophenol is present in the reaction mass at any time, thus maintaining a relatively high ratio of sulfuric acid and phthalic anhydride to p-chlorophenol.

The invention accordingly comprises the steps and their relation exemplified in the process hereinafter disclosed. The scope of the invention will be indicated in the appended patent claims.

In the practice of the present invention in accordance with one method of procedure, a mixture of phthalic anhydride, boric acid or anhydride, and sulfuric acid is heated with agitation to a quinizarine-forming temperature (e. g. 180° to 210° C. when employing p-chlorophenol or hydroquinone, and higher temperatures when employing o-chlorophenol); to the agitated mixture, p-chlorophenol or the other phenol derivative employed is added in small portions over the course of at least two hours, and preferably at least three hours, while continuing the heating at said temperature; and the resulting mixture is further heated at said temperature for an additional period sufficient to complete the reaction, preferably for at least three hours after addition of the phenol derivative has been completed. Preferably, the p-chlorophenol or other phenol derivative is added at a rate not greatly exceeding that at which it is consumed in the reaction. The condensation is carried out in a reaction medium consisting of a mixture of sulfuric acid and boric acid or anhydride ($B_2O_3$) which for simplicity will be referred to hereinafter as "boric-sulfuric acid." The boric acid may be added in the form of ortho-boric acid, meta-boric acid or boron oxide. For simplicity, the boric-sulfuric acid mixture will be assumed to consist of boric anhydride ($B_2O_3$) in sulfuric acid, all of the water in the mixture being considered as being a diluent of the sulfuric acid (although the invention is not bound up with any such theory and the actual composition of the boric acid or anhydride in the mixture is not known), and the strengths and proportions of sulfuric acid in the reaction mixture will be referred to hereinafter on the basis of said assumption, unless otherwise indicated.

The amount of sulfuric acid present in the reaction medium at the beginning of the addition of the phenol derivative may be 10 or less times, and need not exceed 5 times, the total weight of the phenol derivative employed. It is preferred to employ the smallest ratio of sulfuric acid to phenol derivative which is compatible with good quality and yield of quinizarine. Thus, the use of about 5 parts of sulfuric acid per part by weight of p-chlorophenol in the process of the present invention provides essentially the same yield and quality of quinizarine as is obtained by using larger amounts of sulfuric acid. Hence, the use of more than 5 parts of sulfuric acid per part of p-chlorophenol in the present process, although permissive, is not advantageous; it offers insufficient improvement in reaction rate or yield and/or quality of quinizarine to compensate for the increased amounts of acid required and wastages entailed thereby. On the other hand, the employment of considerably smaller amounts of sulfuric acid (e. g., less than 3 parts per part by weight of p-chlorophenol) results in lower yield and quality of quinizarine.

The strength of the sulfuric acid in the boric-sulfuric acid may vary. A strength of about 95% sulfuric acid ordinarily is the minimum. Boric-sulfuric acid media having a concentration of about 98% to 100% sulfuric acid are preferred, since they favor production of quinizarine in particularly good yield and quality. Sulfuric acids of higher concentrations also may be employed, but those substantially stronger than 10% oleum ordinarily are not used, because they tend to promote excessive by-product formation, with consequent deterioration in yield and quality of quinizarine.

Upon completion of the reaction, quinizarine can be recovered from the resulting reaction mixture (in which it is present in the form of the boric ester) by any suitable procedure; as, for example, those employed in the processes of the references referred to above. A simple procedure, whereby quinizarine of satisfactory purity for conversion to dyestuffs and other products is obtained, comprises drowning the hot reaction mixture in hot water, boiling the aqueous mass to hydrolyze the boric ester to quinizarine, filtering, and washing the filter-cake with water. The resulting quinizarine may be extracted with hot dilute aqueous sodium carbonate or sodium bicarbonate, if necessary, to remove alkali-soluble impurities, which may be unreacted phthalic acid or condensation products of phthalic anhydride with the phenol employed.

The invention will be illustrated by the following specific examples in which the parts and percentages are by weight and temperature are in degrees centigrade.

EXAMPLE 1

Part A 33 parts of boric acid ($H_3BO_3$) were dissolved in 225 parts of 26% oleum. This corresponds with a solution of 18 parts of boric anhydride ($B_2O_3$) in 240 parts of 99.3% sulfuric acid. 130 parts of phthalic anhydride were added, and the resulting mixture was heated to 200° to 205°. To the resulting agitated mixture, 50 parts of p-chlorophenol were added in small portions over the course of about 6 hours while maintaining the temperature at 200° to 205°—6¼ parts were introduced initially, and the remainder was added in 23 equal portions at 15 minute intervals. After the addition of the p-chlorophenol was completed, heating of the reaction mixture at 200° to 205° was continued with agitation for an additional 5 hours. The hot reaction mass was then poured into 4,000 parts of hot water (80° to 90°), the aqueous mass was boiled for about an hour to hydrolyze the boric ester of quinizarine, and the mixture was then filtered. The filter-cake of crude quinizarine was washed acid-free with water, and dried at 100°. A yield of 82 parts of quinizarine in the form of a brick-red powder was thus obtained. When a sample of the powder was extracted with boiling chlorobenzene in a Soxhlet extractor, about 3% thereof remained as an insoluble brownish-black residue, and the quinizarine obtained by crystallization from the extract was in the form of fine golden-brown crystals. The yield and quality of quinizarine thus obtained were fully equal to those obtained by the procedure first referred to above (involving heating a mixture of 33 parts of boric acid, 920 parts of 96% sulfuric acid, 130 parts of phthalic anhydride, and 50 parts of p-chlorophenol gradually during about 4 hours to 190°, and then agitating at 190° to 200° for 6 hours to complete the reaction). It is noted that, as compared with the latter reaction mixture, the volume of the reaction mass employed in the present example is less than half.

*Part B*

For purposes of comparison, 50 parts of the p-chlorophenol were added at room temperature to a mixture of phthalic anhydride and boric-sulfuric acid of the same composition as in above part A; the mixture was rapidly heated to a temperature of 200° and maintained at said temperature with agitation for a total period of 10 hours; and, at the end of the heating period, the hot reaction mass was drowned in 4,000 parts of hot water and further treated in the manner set out above in part A. A yield of 83 parts of a crude quinizarine in the form of a dark yellowish-brown powder was thus obtained. When a sample of this powder was extracted with boiling chlorobenzene in a Soxhlet extractor, about 6% thereof remained as an insoluble residue, and the quinizarine obtained by crystallization from the extract was in the form of coarse, black crystals.

EXAMPLE 2

A solution prepared by dissolving 23.4 parts of meta-boric acid ($HBO_2$) in a mixture of 56.5 parts of 26% oleum and 93.5 parts of 100% sulfuric acid (corresponding with a solution of 18.6 parts of boric anhydride in 155 parts of 99% sulfuric acid) was employed in the process of Example 1, part A. A yield of 77 parts of quinizarine in the form of a brick-red powder was obtained. When a sample of the powder was extracted with boiling chlorobenzene in a Soxhlet extractor, less than 1% thereof remained as an insoluble residue, and the quinizarine obtained by crystallization from the extract was in the form of golden-brown crystals.

EXAMPLE 3

A solution prepared by dissolving 23.4 parts of meta-boric acid in 240 parts of 100% sulfuric acid (corresponding with a solution of 18.5 parts of boric anhydride in 244.8 parts of 98% sulfuric acid) was employed in the process of Example 1, part A. A yield of 85 parts of quinizarine in the form of a powder similar to that of said example was obtained. When a sample of the powder was extracted with chlorobenzene in a Soxhlet extractor, about 1.5% thereof remained as an insoluble residue, and the quinizarine obtained by crystallization from the extract was in the form of golden-brown crystals somewhat darker than those of Example 1, part A.

EXAMPLE 4

A solution prepared by dissolving 18.6 parts of $B_2O_3$ in 240 parts of 99.3% sulfuric acid was employed in the process of Example 1, part A. A yield of 80 parts of quinizarine in the form of a powder similar to that of said example was obtained. When a sample of the powder was extracted with chlorobenzene in a Soxhlet extractor, about 1.3% thereof remained as an insoluble residue, and the quinizarine obtained by crystallization from the extract was in the form of golden-brown crystals somewhat lighter than those of Example 1, part A.

EXAMPLE 5

43.3 parts of ortho-boric acid were dissolved in 460 parts of 100% sulfuric acid. This corresponded with a solution of 24.5 parts of $B_2O_3$ in 478.8 parts of 96% sulfuric acid. 130 parts of phthalic anhydride were added, and the resulting mixture was heated to 185° to 190°. To the resulting agitated mixture, 50 parts of p-chlorophenol were introduced portion-wise during 3 hours while maintaining the temperature of the reaction mass at 185° to 190°—12.5 parts were added initially and the remainder was added in six equal portions at half-hour intervals. The reaction mass was further agitated at 185° to 190° for 15 hours to complete the reaction, after which it was drowned in 4,000 parts of hot water and worked up in the foregoing manner. 80 parts of a brick-red powder similar to that produced in Example 1, part A, were obtained. When extracted with chlorobenzene in the above manner, about 4% remained as an insoluble residue, and the quinizarine obtained by crystallization from the extract was in the form of fine golden-brown crystals.

EXAMPLE 6

A solution prepared by dissolving 21.6 parts of boric acid in 460 parts of 100% sulfuric acid (corresponding with a solution of 12.2 parts of $B_2O_3$ in 469.4 parts of 98% sulfuric acid) was employed in the process of Example 5. Similar results were obtained.

It will be evident to those skilled in the art that the invention is not limited to the details of the foregoing illustrative examples and that changes can be made without departing from the scope of the invention.

Thus the proportions of phthalic anhydride and boric anhydride present in the phthalic anhydride boric-sulfuric acid mixture to which the phenol derivative is added may be varied. Preferably, an amount of phthalic anhydride equal to about two and one-half times the weight of phenol derivative is employed. Substantially greater amounts of phthalic anhydride produce a somewhat higher yield of quinizarine; but the resulting advantage is offset to a considerable extent by losses of unreacted excess phthalic anhydride and increased amounts of sulfuric acid required for solvent purposes. Other conditions being equal, amounts substantially lower than 1.8 parts of phthalic anhydride per part of phenol derivative lead to a somewhat lower yield of quinizarine.

Amounts of boric acid (in terms of $B_2O_3$) equal to at least one-fifth of the weight of the phenol derivative are preferably employed. No substantial difference in yield and quality of quinizarine results from the use of greater amounts. Ordinarily, amounts less than 1½ times the weight of the phenol derivative are employed, since greater amounts require larger amounts of sulfuric acid without providing substantial compensating benefits.

The temperature to which the phthalic anhydride boric-sulfuric acid mixture is heated prior to the addition of the phenol derivative also may be varied, and will depend to some extent upon the nature of the phenol derivative. When p-chlorophenol is employed, the mixture is preferably maintained at a temperature of 190° to 210° C., since such temperatures provide a rapid rate of reaction without adversely affecting yield and quality of quinizarine. Lower temperatures, such as 180° C., may be employed, however. Temperatures materially exceeding 210° C., say 230° C. or higher, are less satisfactory since they tend to cause increased formation of by-products. When o-chlorophenol is employed alone or mixed with p-chlorophenol, somewhat higher temperatures are preferably employed, for example 220° to 250° C.

The addition of the phenol derivative to the heated phthalic anhydride boric-sulfuric acid mixture is preferably carried out by adding small portions of the total quantity of phenol derivative at such intervals that at least two hours is required for the addition.

Advantageously, the phenol derivative is added in substantially uniform small amounts over a period of at least three hours. The optimum rate of addition will vary somewhat with the particular temperature and, to some extent, with the other conditions, and it can be determined experimentally for any particular case. For example, when employing the temperatures and proportions of reactants set out in Example 1, part A, a slight improvement in quality and about a 10% increase in yield were obtained by adding the p-chlorophenol over the course of 6 hours followed by a further heating period of 3 hours, as compared with carrying out the addition over the course of 3 hours followed by a further heating period of 6 hours.

The extent to which the reaction mixture is heated after the addition of the phenol derivative is completed also may be varied, as will be evident from the above examples.

I claim:

1. In the production of quinizarine by a process which comprises heating one part by weight of a non-sulfonated derivative of phenol adapted to condense with phthalic anhydride to form quinizarine, with at least 1.8 parts by weight of phthalic anhydride in a boric-sulfuric acid reaction medium containing one-fifth to 1½ parts by weight of boric anhydride, at a quinizarine-forming temperature, the improvement which comprises adding one part by weight of said derivative of phenol over the course of at least two hours to a mixture of the other reactants containing not more than 10 parts by weight of sulfuric acid of at least 95% strength while maintaining the mixture at a temperature within the range 180° to 250° C.

2. In the production of quinizarine by a process which comprises heating one part by weight of p-chlorophenol with at least 1.8 parts by weight of phthalic anhydride in a boric-sulfuric acid reaction medium containing one-fifth to 1½ parts by weight of boric anhydride, at a quinizarine-forming temperature, the improvement which comprises adding one part by weight of p-chlorophenol over the course of at least three hours to a mixture of the other reactants containing not more than 10 parts by weight of sulfuric acid of at least 95% strength while maintaining the mixture at a temperature within the range 180° to 210° C.

3. In the production of quinizarine by a process which comprises heating one part by weight of p-chlorophenol with at least 1.8 to not substantially more than 2½ parts by weight of phthalic anhydride in a boric-sulfuric acid reaction medium containing one-fifth to 1½ parts by weight of boric anhydride, at a quinizarine-forming temperature, the improvement which comprises adding one part by weight of p-chlorophenol over the course of at least three hours to a mixture of the other reactants containing 3 to 5 parts by weight of sulfuric acid of 98% to 100% strength while maintaining the mixture at a temperature within the range 180° to 210° C.

4. The method of producing quinizarine which comprises heating at least 1.8 parts by weight of phthalic anhydride in a boric-sulfuric acid reaction medium to a temperature of 180° to 210° C., said reaction medium containing 3 to 10 parts of sulfuric acid of a strength corresponding with 95% sulfuric acid to 10% oleum and at least one-fifth to 1½ parts by weight of boric anhydride, adding 1 part by weight of p-chlorophenol to said heated mixture over the course of at least 2 hours while maintaining a temperature of 180° to 210° C., and heating the resulting mixture at a temperature of 180° to 210° C. for an additional period of at least 3 hours.

5. The method of producing quinizarine which comprises heating at least 1.8 parts to not substantially more than 2½ parts by weight of phthalic anhydride in a boric-sulfuric acid reaction medium to a temperature of 190° to 210° C., said reaction medium containing 3 to 10 parts of sulfuric acid of a strength corresponding with 95% sulfuric acid to 10% oleum and at least one-fifth to 1½ parts by weight of boric anhydride, adding 1 part by weight of p-chlorophenol to said heated mixture over the course of at least 3 hours while maintaining a temperature of 190° to 210° C., and heating the resulting mixture at a temperature of 190° to 210° C., for an additional period of at least 3 hours.

6. The method of producing quinizarine which comprises heating a mixture of about 2½ parts by weight of phthalic anhydride in a boric-sulfuric acid reaction medium to a temperature of 190° to 210° C., said reaction medium containing about 5 parts of sulfuric acid of 98% to 100% strength and at least one-fifth to 1½ parts by weight of boric anhydride, adding 1 part by weight of p-chlorophenol to said heated mixture over the course of at least 3 hours while maintaining a temperature of 190° to 210° C., and heating the resulting mixture at a temperature of 190° to 210° C. for an additional period of at least 3 hours.

FREDERIC L. SIEVENPIPER.

REFERENCES CITED

The following references are of record in the file of this patent:

UNITED STATES PATENTS

| Number | Name | Date |
|---|---|---|
| 1,790,510 | Orelup | Jan. 27, 1931 |

FOREIGN PATENTS

| Number | Country | Date |
|---|---|---|
| 550,362 | France | Dec. 11, 1922 |

OTHER REFERENCES

Reynolds and Bigelow: "Journal American Chemical Society," vol. 48, pages 420–422 (1926).